United States Patent
Fowe et al.

(10) Patent No.: US 9,911,327 B2
(45) Date of Patent: Mar. 6, 2018

(54) METHOD AND APPARATUS FOR IDENTIFYING A SPLIT LANE TRAFFIC LOCATION

(71) Applicant: HERE Global B.V., Eindhoven (NL)

(72) Inventors: James Fowe, Chicago, IL (US); Joe Ciprian, Chicago, IL (US); Piotr Knap, Chicago, IL (US); Yingzhou Yu, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/142,336

(22) Filed: Apr. 29, 2016

(65) Prior Publication Data

US 2017/0004707 A1 Jan. 5, 2017

Related U.S. Application Data

(63) Continuation-in-part of application No. 14/755,927, filed on Jun. 30, 2015, now Pat. No. 9,640,071.

(51) Int. Cl.
*G08G 1/01* (2006.01)
*G08G 1/052* (2006.01)
(Continued)

(52) U.S. Cl.
CPC ....... *G08G 1/0133* (2013.01); *G01C 21/3415* (2013.01); *G01C 21/3492* (2013.01);
(Continued)

(58) Field of Classification Search
CPC ........... G08G 1/0133; G08G 1/096844; G08G 1/096775; G08G 1/0145; G08G 1/167;
(Continued)

(56) References Cited

U.S. PATENT DOCUMENTS

| 8,014,937 B2 | 9/2011 | Smyth et al. |
| 2004/0034467 A1 | 2/2004 | Sampedro et al. |

(Continued)

FOREIGN PATENT DOCUMENTS

| EP | 1 938 296 B1 | 7/2008 |
| EP | 2 278 573 A | 1/2011 |

(Continued)

OTHER PUBLICATIONS

"A New Kind of Fundamental Diagram with an Application to Road Traffic Emission Modelling"; [online] [retrieved Aug. 10, 2015]. Retrieved from the Internet: http://www.researchgate.net/profile/Antoine_Tordeux/publication/259535754_A_new_kind_of_fundamental_diagram_with_an_application_to_road_traffic_e_mission_modeling/links/00b7d52cea5f2bede2000000.pdf. (dated Mar. 2014); pp. 1-23.

(Continued)

*Primary Examiner* — Brian P Sweeney
(74) *Attorney, Agent, or Firm* — Alston & Bird LLP

(57) ABSTRACT

A method, apparatus and computer program product are provided to identify a split lane traffic location. In a method, a distribution of speeds associated with a plurality of historical probe points representative of travel along a road segment upstream of diverging downstream road segments is determined for each of a plurality of epochs. For each epoch, the distribution is evaluated to cluster the speeds associated with the plurality of historical probe points during the respective epoch into higher and lower speed clusters. For each epoch, it is determined whether a bi-modality condition exists upstream of the diverging downstream road segments based upon a relationship between the higher speed and the lower speed during the respective epoch. A split lane traffic location is then identified based upon a bi-modality frequency with which a bi-modality condition is (Continued)

determined from the historical probe points associated with the plurality of epochs.

20 Claims, 8 Drawing Sheets

(51) Int. Cl.
| | | |
|---|---|---|
| *G01C 21/34* | (2006.01) | |
| *G01C 21/36* | (2006.01) | |
| *G08G 1/0967* | (2006.01) | |
| *G08G 1/0968* | (2006.01) | |
| *G08G 1/16* | (2006.01) | |

(52) U.S. Cl.
CPC ..... *G01C 21/3658* (2013.01); *G01C 21/3691* (2013.01); *G01C 21/3694* (2013.01); *G08G 1/0112* (2013.01); *G08G 1/0129* (2013.01); *G08G 1/0141* (2013.01); *G08G 1/0145* (2013.01); *G08G 1/052* (2013.01); *G08G 1/096775* (2013.01); *G08G 1/096844* (2013.01); *G08G 1/167* (2013.01)

(58) Field of Classification Search
CPC .... G08G 1/0141; G08G 1/0112; G08G 1/052; G08G 1/0129; G01C 21/3691; G01C 21/3658; G01C 21/3694; G01C 21/3415; G01C 21/3492
USPC .......................................................... 701/119
See application file for complete search history.

(56) References Cited

U.S. PATENT DOCUMENTS

| | | | | |
|---|---|---|---|---|
| 2012/0095682 | A1* | 4/2012 | Wilson .................. | G01C 21/32 701/532 |
| 2013/0275033 | A1 | 10/2013 | Bastiaensen et al. | |
| 2013/0282264 | A1* | 10/2013 | Bastiaensen ....... | G01C 21/3492 701/119 |
| 2015/0057913 | A1 | 2/2015 | Benhammou | |
| 2016/0004915 | A1 | 1/2016 | Chen et al. | |

FOREIGN PATENT DOCUMENTS

| | | |
|---|---|---|
| WO | WO 2007/103180 A2 | 9/2007 |
| WO | WO 2008/021551 A2 | 2/2008 |
| WO | WO 2011/160039 A1 | 12/2011 |
| WO | WO 2012/089281 A1 | 7/2012 |
| WO | WO 2012/104392 A1 | 8/2012 |

OTHER PUBLICATIONS

"A Driving Route Made Just for You" [online] [retrieved Apr. 15, 2015]. Retrieved from the Internet: <URL: http://www.technologyreview.com/news/425271/a-driving-route-made-just-for- you/>. (dated Aug. 30, 2011); 2 pages.
Wang, Zuchao, et al.; "Visual Traffic Jam Analysis Based on Trajectory Data"; IEEE Transactions on Visualization and Computer Graphics; vol. 19, No. 12; Dec. 2013; pp. 2159-2168.
U.S. Appl. No. 14/755,927, by inventor Fowe et al., entitled "Method and Apparatus for Identifying a Bi-Modality Condition Upstream of Diverging Road Segments," 40 pages.
Office Action for U.S. Appl. No. 14/755,927 dated Jul. 18, 2016.
U.S. Appl. No. 15/142,336, by inventor Fowe et al., entitled "Method and Apparatus for Identifying a Split Lane Traffic Location," filed Apr. 19, 2016.
Speeded Up Robust Features—Wikipedia [online] [retrieved Nov. 30, 2016]. Retrieved from the Internet: <URL:https://en.wikipedia.org/wiki/Speeded_up_robust_features>. 4 pages.
Viterbi Algorithm—Wikipedia [online] [retrieved Nov. 30, 2016]. Retrieved from the Internet: <URL:https ://en.wikipedia.org/wiki/Viterbi_algorithm>. 9 pages.
Canny Edge Detector—Wikipedia [online] [retrieved Nov. 30, 2016]. Retrieved from the Internet: <URL:https://en.wikipedia.org/wild/Canny_edge_detector>. 6 pages.
Notice of Allowance for U.S. Appl. No. 14/755,927 dated Dec. 22, 2016.
International Search Report and Written Opinion for International Application No. PCT/EP2016/063758 dated Oct. 7, 2016.
Office Action for U.S. Appl. No. 15/221,112 dated Dec. 11, 2017, 20 pages.

\* cited by examiner

METHOD AND APPARATUS FOR IDENTIFYING A SPLIT LANE TRAFFIC LOCATION

CROSS-REFERENCE TO RELATED APPLICATIONS

The present application is a continuation-in-part of and claims priority to U.S. patent application Ser. No. 14/755,927 entitled "Method and Apparatus for Identifying a Bi-Modality Condition Upstream of Diverging Road Segments" filed Jun. 30, 2015, the entire contents of which are incorporated by reference herein.

TECHNOLOGICAL FIELD

An example embodiment relates generally to the identification of a split lane traffic location and, more particularly, to the determination of a split lane traffic location based upon an analysis of historical probe points.

BACKGROUND

Split lane traffic is the traffic that travels along a road segment that splits or is otherwise divided into two or more downstream road segments. Split lane traffic may sometimes create a bi-modality condition in which traffic in some of the lanes moves at a higher speed than traffic in other lanes. For example, a road segment may be upstream of two or more diverging downstream road segments, such as an exit ramp that exits to the right or left of an ongoing roadway. In some instances, the traffic in the lanes that are utilized to access the exit ramp may slow to a greater degree than the traffic in the other lanes that generally proceeds onward past the exit ramp. For example, at rush hour or at other times at which the roadway carries an appreciable volume of traffic, the lanes from which the exit ramp is accessed may slow to a much greater degree than the traffic in the other lanes that is generally preceding onward past the exit ramp. At other times, such as in instances in which the traffic volume is relatively light, all of the lanes of traffic for the road segment upstream of the diverging downstream road segments may precede at approximately the same speed with little, if any, diminution of speed in the lanes from which the exit ramp is accessed.

Routing algorithms, such as routing algorithms employed by navigation devices, generally do not take into account the speed differential between different lanes of traffic, particularly in instances in which the speed differential is transient. As such, the routing algorithms may not perform as well as is desired when confronted with a bi-modality condition. For example, in instances in which the speed of traffic flow various significantly between the various lanes of a road segment upstream of the diverging downstream road segments, the routing algorithm may operate on the assumption that the traffic will move uniformly at the higher speed experienced by the lanes of traffic that proceed onward past the exit ramp without any appreciable diminution of the speed due to traffic delays in advance of the exit ramp. Consequently, a user or an autonomous vehicle that is relying upon the routing algorithm and who drives in the lane of traffic that is delayed in advance of the exit ramp may find that the estimated time of arrival provided by the routing algorithm may be incorrect. Depending upon the extent of the delay, the user also may be disappointed that the routing algorithm did not either direct the user to a different roadway or otherwise endeavor to avoid the lanes of traffic that slowed in advance of the exit ramp.

BRIEF SUMMARY

A method, apparatus and computer program product are provided in accordance with an example embodiment in order to identify a split lane traffic location. In this regard, the method, apparatus and computer program product of an example embodiment may identify the split lane traffic location based upon an analysis of historical probe points and a bi-modality frequency that is determined from the analysis of the historical probe points. By analyzing historical probe points, a split lane traffic location may be automatically identified. Once identified, the current traffic in the vicinity of the split lane traffic location may be analyzed to identify a bi-modality condition upstream of diverging downstream road segments. The bi-modality condition may then be taken into account, such as by routing algorithm, in conjunction with the routing of a vehicle, the directions and/or alerts provided along the route, such as to avoid the lanes of the road segment that are experiencing delays upstream of the diverging downstream road segments, and the estimation of the time of arrival.

In an example embodiment, a method is provided that includes determining a distribution of speeds associated with a plurality of historical probe points representative of travel along a road segment upstream of diverging downstream road segments during each of a plurality of epochs. For each of the plurality of epochs, the method also includes evaluating the distribution so as to cluster the speeds associated with the plurality of historical probe points during the respective epoch into a higher speed cluster associated with a higher speed and a lower speed cluster associated with a lower speed. For each of the plurality of epochs, the method further includes determining whether a bi-modality condition exists upstream of the diverging downstream road segments based upon a relationship between the higher speed and the lower speed during the respective epoch. The method also includes identifying a split lane traffic location based upon a bi-modality frequency with which a bi-modality condition is determined from the historical probe points associated with the plurality of epochs.

The road segment upstream of the diverging downstream road segments may include a plurality of links. In this example embodiment, the method determines the distribution of speeds, evaluates the distribution, and determines whether a bi-modality condition exists for the link closest to the diverging downstream road segments for each of the plurality of epochs. The method of an example embodiment also includes determining the bi-modality frequency based upon a relationship between a number of epochs for which the bi-modality condition is determined to exist and a total number of epochs for which the historical probe points are evaluated. In this regard, the relationship may be determined by determining a ratio of the number of epochs for which the bi-modality condition is determined to exist to the total number of epochs for which the historical probe points are evaluated.

The method of an example embodiment identifies the split lane traffic location by identifying the upstream road segment and the diverging downstream road segments as the split lane traffic location in an instance in which the bi-modality frequency satisfies a predefined threshold. In an example embodiment, the method determines whether a bi-modality condition exists by separating the speeds associated with the plurality of historical probe points for the respective epoch into a plurality of bins and determining a bi-modality value based upon a difference between mean speeds of the different bins and also based on a range of the speeds. For example, the bi-modality value may be determined based upon a ratio of the difference between mean speeds of the different bins and the range of the speeds during the respective epoch.

In another example embodiment, an apparatus is provided that includes at least one processor and at least one memory including computer program code with the at least one memory and the computer program code configured to, with the processor, cause the apparatus to at least determine a distribution of speeds associated with a plurality of historical probe points representative of travel along a road segment upstream of diverging downstream road segments during each of a plurality of epochs. For each of the plurality of epochs, the at least one memory and the computer program code are also configured to, with the processor, cause the apparatus to evaluate the distribution so as to cluster the speeds associated with the plurality of historical probe points during the respective epoch into a higher speed cluster associated with a higher speed and a lower speed cluster associated with a lower speed. For each of the plurality of epochs, the at least one memory and the computer program code are further configured to, with the processor, cause the apparatus to determine whether a bi-modality condition exists upstream of the diverging downstream road segments based upon a relationship between the higher speed and the lower speed during the respective epoch. The at least one memory and the computer program code are also configured to, with the processor, cause the apparatus to identify a split lane traffic location based upon a bi-modality frequency with which a bi-modality condition is determined from the historical probe points associated with the plurality of epochs.

The road segment upstream of the diverging downstream road segments may include a plurality of links. In this example embodiment, the at least one memory and the computer program code are configured to, with the processor, cause the apparatus to determine the distribution of speeds, evaluate the distribution, and determine whether a bi-modality condition exists for the link closest to the diverging downstream road segments for each of the plurality of epochs. The at least one memory and the computer program code are further configured to, with the processor, cause the apparatus of an example embodiment to determine the bi-modality frequency based upon a relationship between a number of epochs for which the bi-modality condition is determined to exist and a total number of epochs for which the historical probe points are evaluated. In this regard, the relationship may be determined by determining a ratio of the number of epochs for which the bi-modality condition is determined to exist to the total number of epochs for which the historical probe points are evaluated.

The at least one memory and the computer program code are configured to, with the processor, cause the apparatus of an example embodiment to identify the split lane traffic location by identifying the upstream road segment and the diverging downstream road segments as the split lane traffic location in an instance in which the bi-modality frequency satisfies a predefined threshold. In an example embodiment, the at least one memory and the computer program code are configured to, with the processor, cause the apparatus to determine whether a bi-modality condition exists by separating the speeds associated with the plurality of historical probe points for the respective epoch into a plurality of bins and determining a bi-modality value based upon a difference between mean speeds of the different bins and also based on a range of the speeds. For example, the bi-modality value may be determined based upon a ratio of the difference between mean speeds of the different bins and the range of the speeds during the respective epoch.

In a further example embodiment, a computer program product is provided that includes at least one non-transitory computer-readable storage medium having computer-executable program code portions stored therein with the computer-executable program code portions including program code instructions configured to determine a distribution of speeds associated with a plurality of historical probe points representative of travel along a road segment upstream of diverging downstream road segments during each of a plurality of epochs. For each of the plurality of epochs, the computer-executable program code portions also include program code instructions configured to evaluate the distribution so as to cluster the speeds associated with the plurality of historical probe points during the respective epoch into a higher speed cluster associated with a higher speed and a lower speed cluster associated with a lower speed. For each of the plurality of epochs, the computer-executable program code portions further include program code instructions configured to determine whether a bi-modality condition exists upstream of the diverging downstream road segments based upon a relationship between the higher speed and the lower speed during the respective epoch. The computer-executable program code portions also include program code instructions configured to identify a split lane traffic location based upon a bi-modality frequency with which a bi-modality condition is determined from the historical probe points associated with the plurality of epochs.

The road segment upstream of the diverging downstream road segments may include a plurality of links. In this example embodiment, the program code instructions are configured to determine the distribution of speeds, evaluate the distribution, and determine whether a bi-modality condition exists for the link closest to the diverging downstream road segments for each of the plurality of epochs. In an example embodiment, the computer-executable program code portions further include program code instructions configured to determine the bi-modality frequency based upon a relationship between a number of epochs for which the bi-modality condition is determined to exist and a total number of epochs for which the historical probe points are evaluated. In this regard, the relationship may be determined by determining a ratio of the number of epochs for which the bi-modality condition is determined to exist and the total number of epochs for which the historical probe points are evaluated.

In an example embodiment, the program code instructions configured to identify the split lane traffic location include program code instructions configured to identify the upstream road segment and the diverging downstream road segments as the split lane traffic location in an instance in which the bi-modality frequency satisfies a predefined threshold. In an example embodiment, the program code instructions configured to determine whether a bi-modality condition exists include program code instructions configured to separate the speeds associated with the plurality of historical probe points for the respective epoch into a plurality of bins and determine a bi-modality value based upon a difference between mean speeds of the different bins and also based on a range of the speeds. For example, the bi-modality value may be determined based upon a ratio of the difference between mean speeds of the different bins and the range of the speeds during the respective epoch.

In yet another example embodiment, an apparatus is provided that includes means for determining a distribution of speeds associated with a plurality of historical probe points representative of travel along a road segment upstream of diverging downstream road segments during each of a plurality of epochs. For each of the plurality of epochs, the apparatus also includes means for evaluating the distribution so as to cluster the speeds associated with the plurality of historical probe points during the respective epoch into a higher speed cluster associated with a higher speed and a lower speed cluster associated with a lower speed. For each of the plurality of epochs, the apparatus further includes means for determining whether a bi-modality condition exists upstream of the diverging downstream road segments based upon a relationship between the higher speed and the lower speed during the respective epoch. The apparatus also includes means for identifying a split lane traffic location based upon a bi-modality frequency with which a bi-modality condition is determined from the historical probe points associated with the plurality of epochs.

BRIEF DESCRIPTION OF THE DRAWINGS

Figure 1:
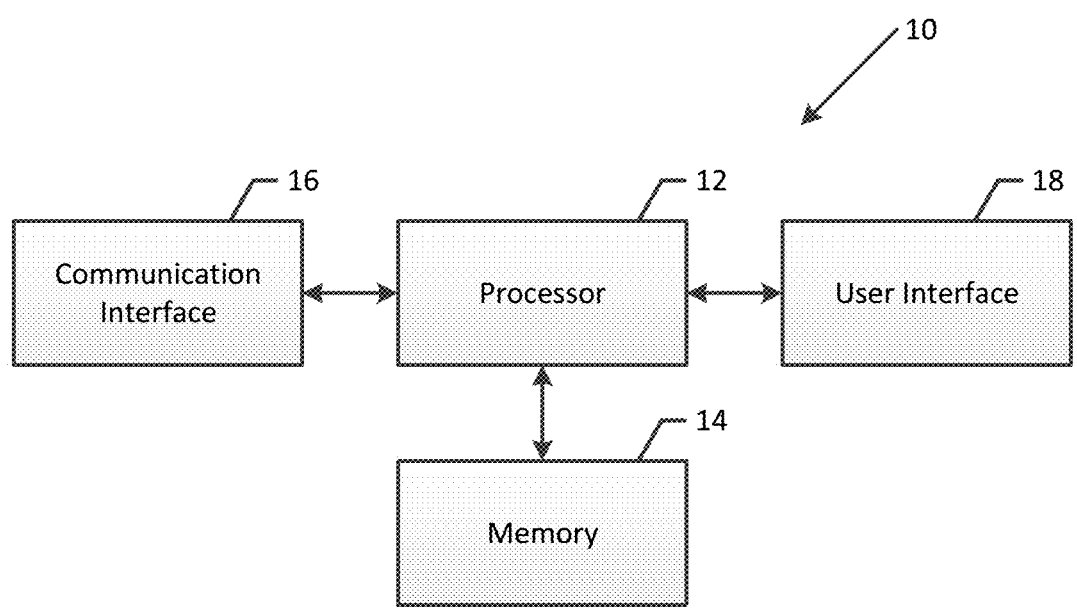
Figure 2:
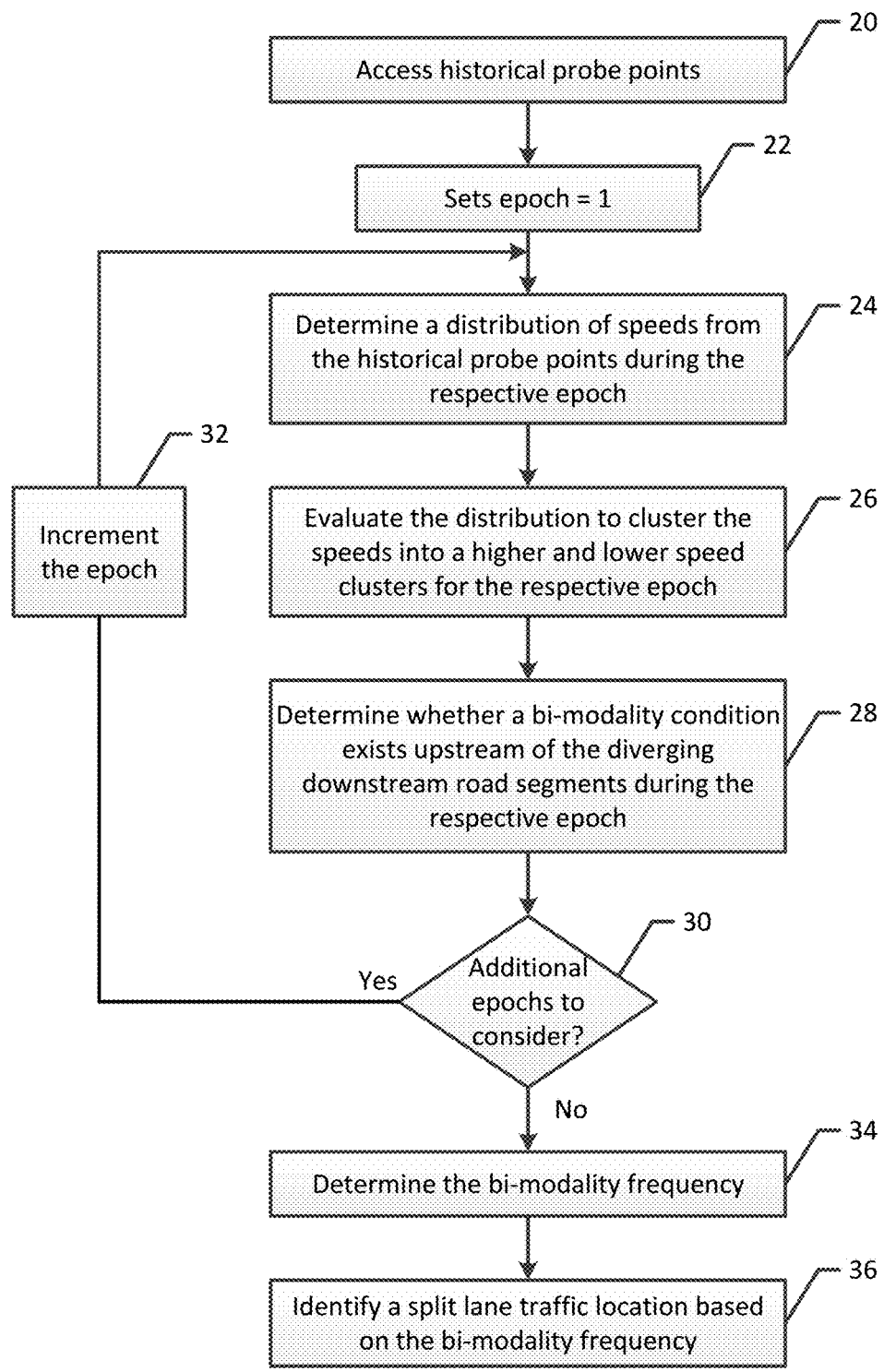
Figure 3:
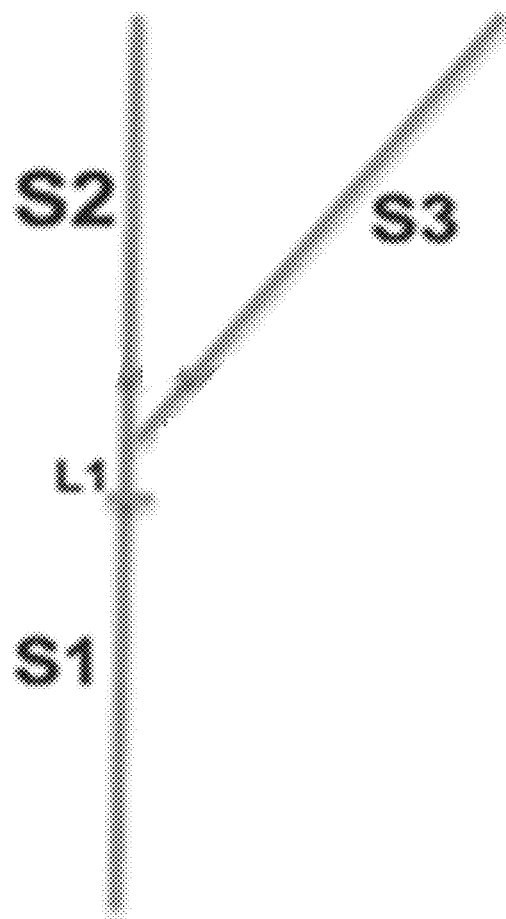
Figure 4:
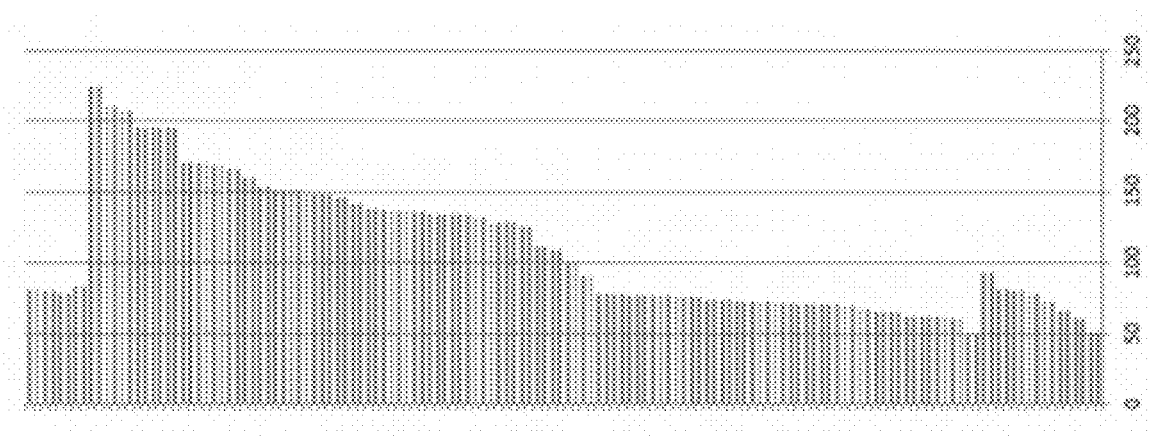
Figure 5:
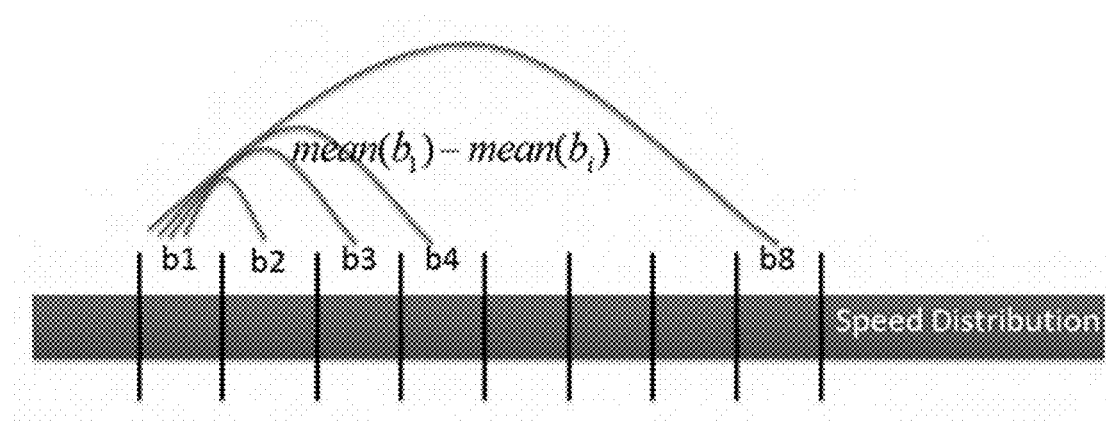
Figure 6:
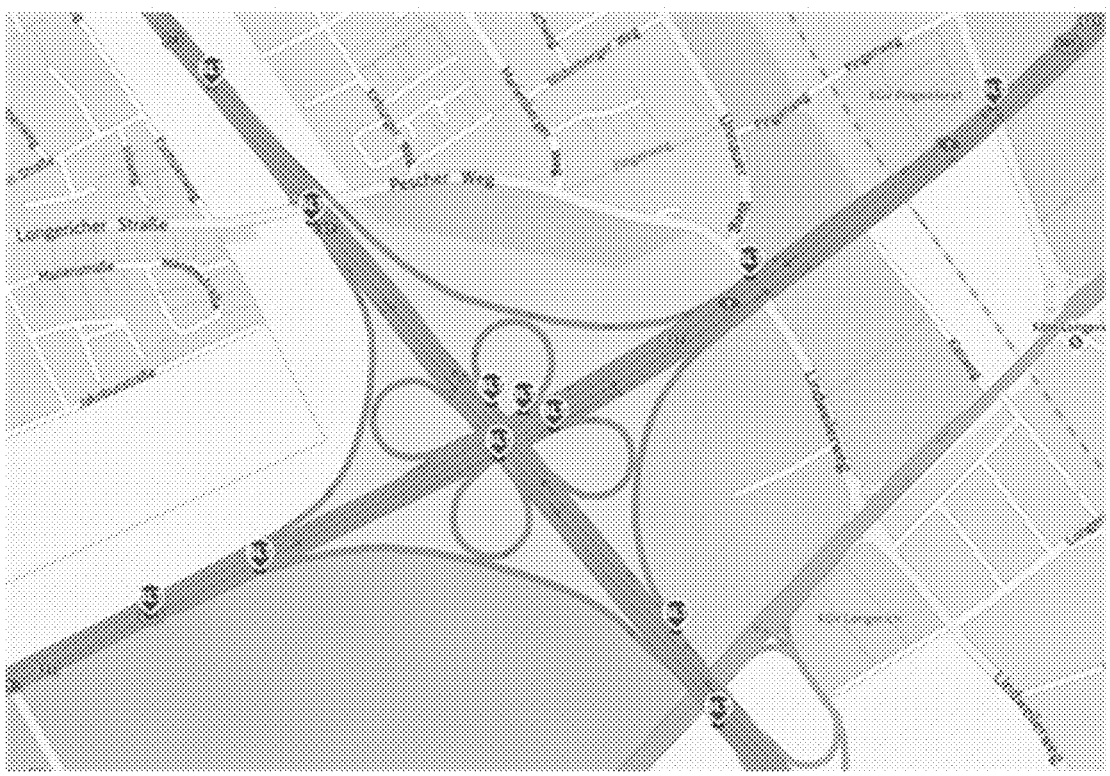
Figure 7:
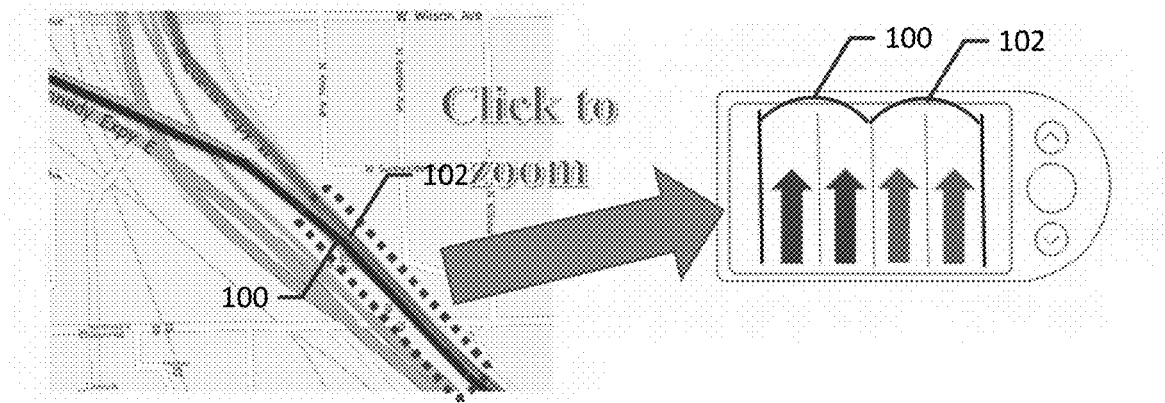
Figure 8:
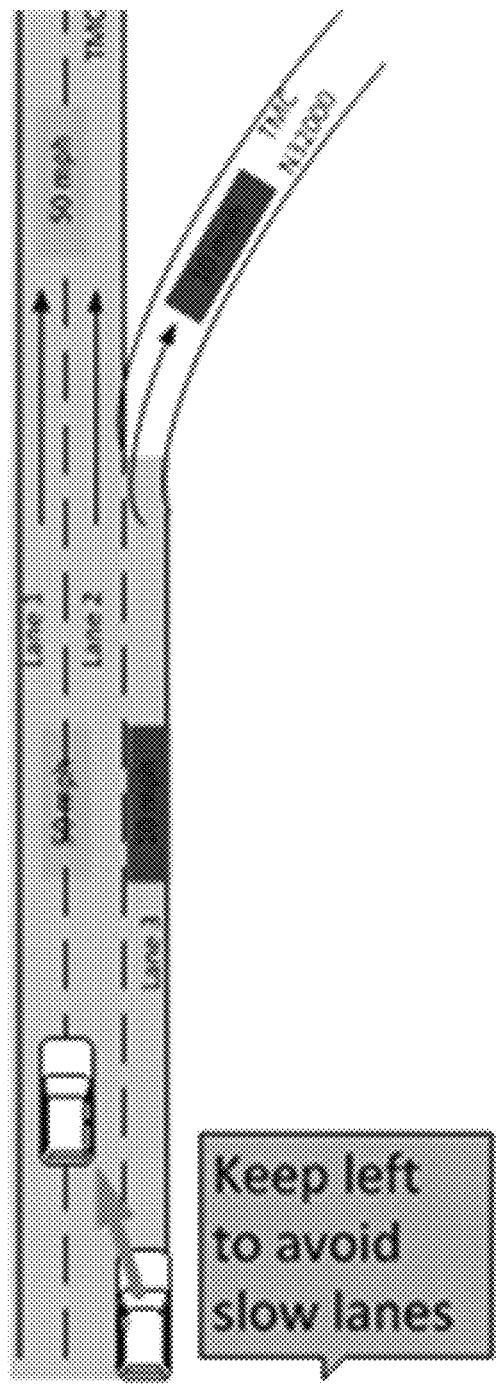

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present invention;

FIG. 2 is a flowchart illustrating operations performed, such as by the apparatus of FIG. 1, in accordance with an example embodiment of the present invention;

FIG. 3 illustrates the initial link of the upstream road segment as well as the pair of diverging downstream road segments that are evaluated in accordance with an example embodiment of the present invention;

FIG. 4 is a graphical representation of the distribution of speeds associated with a plurality of historical probe points that illustrates a manner in which the speeds may be clustered into a higher speed cluster and a lower speed cluster in accordance with an example embodiment of the present invention;

FIG. 5 is a graphical representation of the manner in which the distribution of speeds is evaluated in accordance with an example embodiment of the present invention in order to identify a higher speed cluster and a lower speed cluster;

FIG. 6 is a representation of a map depicting a plurality of split lane traffic locations that have been identified in accordance with an example embodiment of the present invention;

FIG. 7 illustrates a map display generated in accordance with an example embodiment of the present invention in order to differently depict the lanes of the upstream road segment that are traveling at the higher speed and the lower speed; and FIG. 8 is a display presented by a user device in response to a split lane congestion alert message generated in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in order to identify a split lane traffic location based upon an analysis of historical probe points upstream of diverging downstream road segments. Based upon the analysis of the historical probe points, the method, apparatus and computer program product of an example embodiment determine a bi-modality frequency of occurrence of a bi-modality condition in which the speed of travel along a road segment upstream of the diverging downstream road segments varies appreciably between the different lanes of traffic. Once identified, the current traffic in the vicinity of the split lane traffic location may be analyzed to identify a bi-modality condition that currently exists and, in some instances, the extent of the bi-modality condition upstream of the diverging downstream road segments. The identification of a bi-modality condition may allow for improved accuracy in the determination of the estimated time of arrival by taking into account the existence and the extent of a bi-modality condition that may be encountered. Additionally or alternatively, the method, apparatus and computer program product of an example embodiment may provide improvements in routing algorithms by taking into account the bi-modality condition, such as to either entirely re-route a vehicle based upon the bi-modality condition and/or to advise a driver or an autonomous vehicle of an upcoming bi-modality condition such that the driver may consider altering their driving behavior or the autonomous vehicle may determine to alter the driving behavior, such as by changing lanes, to take the bi-modality condition into account.

The apparatus for identifying a split lane traffic location may be embodied by a variety of computing devices including, for example, a server, a plurality of networked computing devices, a computer workstation, a personal computer, a laptop computer or the like, that are configured to analyze historical probe points and to identify split lane traffic locations. Alternatively, the apparatus for identifying a split lane traffic location may be embodied by a navigation system, an advanced driver assistance system (ADAS), a global positioning system (GPS) or the like. In an embodiment in which the apparatus is embodied by a computing device, such as a server, that is distinct from a navigation system, an ADAS, a GPS or the like, the computing device that embodies the apparatus may advantageously be in communication with user device, such as a navigation system, an ADAS, a GPS, a personal navigation device (PND), a portable navigation device or other personal computing device, such as a mobile telephone, a tablet computer or the like, in order to provide information regarding the split lane traffic location to the user.

Regardless of the manner in which the apparatus is embodied, FIG. 1 depicts the apparatus 10 of an example embodiment that includes, or is associated with or otherwise be in communication with, a processor 12 and a memory device 14 and optionally a communication interface 16 and/or a user interface 18. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor, such as historical probe points. Additionally or alternatively, the memory device could be configured to store instructions for execution by the processor.

As noted above, the apparatus 10 may be embodied by a computing device including those described above. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment also optionally includes a communication interface 16 that may be any means such as a device or circuitry embodied in either hardware or a combination of hardware and software that is configured to receive and/or transmit data from/to other electronic devices in communication with the apparatus, such as by being configured to receive probe data from a database, cloud storage or other external memory device and/or to provide a representation of the road geometry and/or split lane congestion alert messages to an in-vehicle GPS, in-vehicle navigation system, a PND, a portable navigation device or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 1, the apparatus 10 may also optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 14 and/or the like).

Referring now to FIG. 2, the operations performed in order to identify a split lane traffic location in accordance with an example embodiment are illustrated. As described below, a split lane traffic location is a road segment upstream of diverging downstream road segments along with the speed of travel occasionally, such as periodically, varies appreciably between the different lanes of traffic, likely attributable to the effects upon the traffic by the diverging downstream road segments. In this regard, a road segment that diverges into two or more downstream road segments may include a plurality of lanes such that the speed of traffic in each lane may be different depending upon the behavior of the vehicles in response to the diverging downstream road segments. By way of example, FIG. 3 depicts an upstream road segment S1 that includes two lanes of traffic. The road segment S1 is upstream of two diverging downstream road segments, namely, a road segment S2 which is a continuation of the road segment S1 and an exit ramp represented by road segment S3. In this example, the right lane of the segment S1 may be more greatly impacted by traffic slowing to take the exit ramp represented by road segment S3 in comparison to the left lane of road segment S1 which continues along road segment S2.

In order to identify that split lane traffic location, the apparatus 10 includes means, such as the processor 12 or the like, for accessing historical probe points. See block 20 of FIG. 2. The historical probe points may be stored in memory 14 or remotely, such as by cloud storage, a remote server, a remote database or the like, that is accessible by the processor.

The probe points are representative of travel along a roadway. The probe points may be collected by a variety of different data collections devices, such as GPS, navigation systems, location tracking systems or the like. These data collection devices may be carried by vehicles, for example, as the vehicles travel along the roads. For example, the data collection devices may be mounted within the vehicles, such as a component of a navigation system, an ADAS or the like, or may be carried by passengers within the vehicle, such as in an instance in which the data collection device is embodied by a mobile terminal, tablet computer or other portable computing device carried by the passenger riding within the vehicle. The data collection devices repeatedly capture probe points as the data collection devices move along a respective road, such as by capturing probe points at a predefined frequency. Each probe point defines a location at which the probe point was captured, such as in terms of latitude and longitude. The probe point may also include or otherwise be associated with a variety of other information including, for example, the speed of the vehicle, the time at which the probe point was captured, etc.

For historical probe points captured over a period of time, such as days, weeks, months or years, the time period during which the historical probe points were captured may then be divided into a plurality of epochs. Each epoch may be of the same duration, such as 5 minutes. Each historical probe point may therefore be associated with a respective epoch during which the probe point was captured.

The historical probe points representative of travel along a road segment upstream of diverging downstream road segments are then analyzed. Although described herein in regards to the analysis of historical probe points representative of the road segment of the diverging downstream road segments, the method and apparatus of an example embodiment are configured to analyze the historical probe points representative of travel along the link of the road segment upstream of the diverging downstream road segments that is closest to the diverging downstream road segments, such as link L1 in FIG. 3, to determine whether the diverging downstream road segments create a split lane traffic location at which the speed of travel varies appreciably between the different lanes of the upstream road segment at least occasionally, such as periodically. In this example embodiment, the historical probe points representative of travel along other links of the upstream road segment that are further from the diverging downstream road segments need not be analyzed with the analysis, instead, focused upon those historical probe points from the link closest to the diverging downstream road segments. Consequently, reference hereinafter to the analysis of historical probe points from the road segment upstream of the diverging downstream road segments contemplated the more particular analysis of historical probe points from the link of the upstream road segment that is closest to the diverging downstream road segments in an example embodiment.

This analysis of the historical probe points in order to identify split lane traffic locations may be repeated for each of a plurality of road segments upstream of respective diverging downstream road segments. The downstream road segments may have various topologies and, as such, may diverge from the upstream road segment in various manners. For example, an exit ramp may diverge either to the right or the left with other lanes of traffic proceeding onward past the exit ramp. Alternatively, a diverging downstream road segment may represent a fork in which the upstream road segment splits into two different diverging downstream road segments, neither of which serves as an exit ramp. Regardless of the type of diverging downstream road segments, the diverging downstream road segments may be identified, either concurrent with or in advance of the identification of the split lane traffic locations. The diverging downstream road segments may be identified in various manners. For example, the diverging downstream road segments may have been previously identified, such as manually during the design of a map or by a prior computerized analysis of the map, and the diverging downstream road segments may be stored, such as either locally by memory 14 or remotely by a memory with which the apparatus is in communication, such as via the communication interface 16. Alternatively the apparatus 10, such as the processor 12, may be configured to evaluate a network of roads, such as represented by map data, and to identify the locations at which a road, such as a multi-lane road, diverges into two or more downstream road segments.

As shown in block 22 of FIG. 2, the historical probe points that are representative of travel along a road segment upstream of diverging downstream road segments may be analyzed during the first epoch. In this regard, the apparatus 10 includes means, such as the processor 12 or the like, for determining a distribution of speeds associated with a plurality of historical probe points representative of travel along the road segment upstream of the diverging downstream road segments during the first epoch. See block 24 of FIG.

2. Although the distribution of speeds along the road segment upstream of the diverging downstream road segments may be represented in various manners, one example distribution of the speeds along the road segment upstream of the diverging downstream road segments is depicted in FIG. 4 in which the speed, represented by the vertical axis, is depicted for each of a plurality of vehicles traveling along the road segment upstream of the diverging downstream road segments within the first epoch. The speed of each vehicle is represented by a vertical bar in the graphical presentation of FIG. 4.

As shown in block 26 of FIG. 2, the apparatus 10 also includes means, such as the processor 12 or the like, for evaluating the distribution so as to cluster the speeds associated with the plurality of historical probe points for the first epoch into a higher speed cluster associated with the higher speed and a lower speed cluster associated with lower speed. Although the evaluation of the distribution maybe performed in various manners, the apparatus, such as the processor, of an example embodiment may be configured to evaluate the distribution of speeds in order to identify if a majority of the probe points are associated with speeds that fall within two different ranges of speeds, one range representative of a higher speed cluster and another range representative of a lower speed cluster. These two ranges may be defined in various manners, but, in one embodiment, the higher speed cluster may be separated from the lower speed cluster, such as by at least a predefined amount, such as 15 km/hr, or a predefined percentage, e.g., 40%, of the overall range of speeds. With respect to the example depicted in FIG. 4, a higher speed cluster may be identified within a range of 150-200 km/hr and another range may be identified from 50-70 km/hr.

The apparatus 10 also includes means, such as the processor 12 or the like, for determining whether a bi-modality condition exists upstream of the diverging downstream road segments based upon a relationship between the higher speed and the lower speed during the first epoch. See block 28 of FIG. 2. The bi-modality condition may be determined in various manners. In an example embodiment, however, the apparatus, such as the processor, utilizes a clustering/ partitioning algorithm to split a bi-modal speed distribution of the first epoch into the higher speed cluster and the lower speed cluster. In this example embodiment, the apparatus, such as the processor, is configured to separate the speeds associated with the probe points into a plurality of bins designated b1, b2 ... b8 in the example of FIG. 5 and to then determine the mean distance between the bins, such as represented by mean ($b_1$)–mean ($b_i$). The apparatus, such as the processor, then utilizes the mean distance between bins to identify the higher speed cluster and the lower speed cluster of the speeds associated with the probe points. The apparatus, such as the processor, of this example embodiment is also configured to determine a bi-modality value BiM which, in turn, is utilized to identify a bi-modality condition for the first epoch. Although the bi-modality value may be defined in various instances, the apparatus, such as the processor, of an example embodiment may be configured to determine the bi-modality value based upon a difference between the mean speeds of the different bins and also based on the range of speeds of the historical probe points for the first epoch. In this regard, the bi-modality value may be based upon a ratio of the difference between mean speeds of the different bins and the range of the speeds during the first epoch. By way of example, the bi-modality value may be defined as the greatest difference between the mean speeds of different bins divided by the range of speeds of the historical probe points for the first epoch, such as BiM= (mean $b_1$–mean($V-b_1$))/R with V and R as defined hereinafter. In an instance in which the bi-modality value fails to satisfy a predefined threshold, such as by being zero or at least less than a predefined threshold, the apparatus, such as the processor, may be configured to determine that the distribution of the speeds associated with the historical probe points of the first epoch does not indicate a bi-modality condition, such as an instance in which traffic moves along each lane of the road segment upstream of the diverging downstream road segments in a relatively uniform manner. However, in an instance in which the bi-modality value satisfies the predefined threshold, such as by exceeding the predefined threshold, a bi-modality condition may be identified for the first epoch.

In an example embodiment, the apparatus 10, such as the processor 12, is configured to determine the bi-modality value and to identify a bi-modality condition therefrom in accordance with the following pseudo code:
Pseudo Code:

```
V ← {a set of probe speeds in an epoch}
function BDM(V):
    s ← STD(V)
    m ← mean(V)
    V ← V ∀ V < m + 2s & V > m − 2s      //first outlier filtering
    d ← Range(V)/8
    for i ← 1 to 8                        //bucketizing
        b_i ← {V ∀ V < max(V) & V > (max(V) − d)}
        V ← V − b_i
    end for
    V ← b_1 + b_2 + ... + b_8             //restore V
    for i ← 2 to 8                        //cluster search
        BiM ← (mean(b_1) − mean(b_i)) / Range(V)
        if |b_1| > 3 and (|V| − |b_1|) > 3 and BiM > 0.4    //3 & 0.4 are tuning paramters
            then return: {(mean(b_1), mean(V − b_1), BiM}    //HS, LS & BiM returned
        else b_1 ← b_1 + b_i
        end if
    end for
end BDM
```

As shown in the foregoing pseudo code, probe points associated with speeds that are outliers, such as probe points associated with speeds that are more than two standard deviations away from the mean, may be filtered or eliminated. Thereafter, the remaining speeds associated with the historical probe points of the first epoch may be separated into bins $b_1, b_2, \ldots b_8$ and the BiM may be determined based upon the difference between the means of the various bins as normalized fashion based upon the range. In this analysis, the normalized difference between the means of the different bins may be subjected to various predefined conditions, such as |b1|>3 and BiM>0.4, with the predefined conditions defining tuning parameters that may be varied by the system designer to ensure the desired performance. For example, |b1|>2 and BiM>0.2 in an alternative embodiment. In this regard, the tuning parameters may be selected so as to return only as single pair of speeds, representative of the higher speed cluster and the lower speed cluster, as well as the magnitude of bi-modality BiM.

Once a bi-modality condition has been identified, the apparatus 10 of an example embodiment may be configured to confirm that the bi-modality condition is attributable to traffic congestion as opposed to a single slow moving car or truck. In order to do so, the apparatus, such as the processor 12, may compare the lower speed to the free flow speed for the downstream road segment that is fed by the congested lane(s) of the upstream road segment. In an instance in which the ratio of the lower speed to the free flow speed for the corresponding downstream road segment is greater than a predefined threshold, it may be determined that a bi-modality condition does not, in fact, exist. However, in an instance in which the ratio of the lower speed to the free flow speed for the corresponding downstream road segment is less than a predefined threshold, the bi-modality condition may be confirmed and processing as set forth by FIG. 2 may proceed.

Following the determination as to whether a bi-modality condition exists for the first epoch, the apparatus 10, such as the processor 12, is configured to determine whether there are historical probe points for additional epochs to be evaluated. See block 30 of FIG. 2. If so, the apparatus, such as the processor, increments the epoch under consideration as shown in block 32 of FIG. 2 and then repeats the process described above in conjunction with blocks 24, 26 and 28 of FIG. 2 for the next epoch in order to determine whether a bi-modality condition exists during the next epoch. This process is repeated until the historical probe points for each of the epochs have been analyzed.

Although every historical probe point for each epoch may be analyzed in accordance with the foregoing process, the apparatus 10, such as the processor 12, of an example embodiment may define a threshold, such as 8 probe points, and, as such, may require at least a threshold number of historical probe points to be associated with a respective epoch for the historical probe points of the respective epoch to be analyzed. In an instance in which there are fewer than the threshold number of historical probe points for a respective epoch, the historical probe points for the respective epoch may not be analyzed as the results may not be considered sufficiently representative.

Once the historical probe points for each of the epochs have been considered, the apparatus 10 also includes means, such as the processor 12 or the like, for identifying a split lane traffic location based upon a bi-modality frequency with which a bi-modality condition is determined from historical probe points associated with a plurality of epochs. See block 46 of FIG. 2. As such, the apparatus of this example embodiment may also include means, such as the processor or the like, for determining the bi-modality frequency based upon a relationship between a number of epochs for which the bi-modality condition is determined to exist and the total number of epochs for which the historical probe points were evaluated. See block 44. For example, the apparatus, such as the processor, may be configured to determine a ratio of the number of epochs in which the bi-modality condition is determined to exist to the total number of epochs from which historical probe points were evaluated. The bi-modality frequency thereby provides an indication as to the frequency with which the speed of travel along the road segment upstream of the diverging downstream road segments appreciably varies between the different lanes of the road segment.

Based upon the bi-modality frequency, the apparatus 10, such as the processor 12, may be configured to identify a split lane traffic location in various manners. In an example embodiment, however, the apparatus, such as the processor, is configured to identify a split lane traffic location proximate the diverging downstream road segments in an instance in which the bi-modality frequency satisfies, such as by equaling or exceeding, a predefined threshold.

Once identified, the apparatus 10, such as the processor 12, may be configured to store a representation of the split lane traffic location, such as in the memory 14 or in a database accessible by the apparatus. Although various representations of the split lane traffic location may be stored, the representation of a split lane traffic location of an example embodiment may include a unique identifier for the respective split lane traffic location, an identification of the upstream road segment S1 including the link L1 closest to the diverging downstream road segments, and an identification of the diverging downstream road segments S2 and S3. In an instance in which the diverging downstream road segments represent a fork in the roadway, segments S2 and S3 represent the two diverging downstream road segments. Alternatively, in an instance in which the diverging downstream road segments include an exit ramp and one or more lanes that continue along the roadway past the exit ramp, segment S2 represents the portion of the roadway that continues onward past the exit ramp, while segment S3 represents the exit ramp. The representation of the split lane traffic location may also include the total number of lanes on the link L1 closest to the diverging downstream road segments and of those lanes, the particular lanes that lead toward the respective diverging downstream road segments. The representation of split lane traffic location may also include an indication of the topology type, such as a fork or a ramp, as well as the bi-modality frequency that is determined in association with the split lane traffic location. While one example of the manner in which a split lane traffic location is represented is provided above, the split lane traffic location may be represented in other manners in other embodiments.

This foregoing process of identifying a split lane traffic location is then repeated for each of the other diverging downstream road segments that with historical probe points associated therewith in order to identify other split lane traffic locations. By way of example, FIG. 6 depicts a portion of a map in which a plurality of locations along the roads are designated by SLT to indicate the split lane traffic locations. In each instance, a road segment designated by SLT diverges into two or more downstream road segments. After the split lane traffic locations have been identified based upon the historical probe points, the current traffic in the vicinity of the split lane traffic locations may be analyzed, such as repeatedly, e.g., periodically, in order to identify whether a bi-modality condition currently exists upstream with the respective diverging road segments and, in some embodiments, the extent of any bi-modality condition that is identified. The analysis of the current traffic in the vicinity of a split lane traffic location and the identification of a bi-modality condition upstream of the respective diverging road segments may be performed in various manners including, for example, as described by U.S. patent application Ser. No. 14/755,927 entitled. "Method and Apparatus for Identifying a Bi-modality Condition Upstream of Diverging Road Segments" filed Jun. 30, 2015, the entire contents of which are incorporated herein by reference.

By way of example, for a respective split lane traffic location, the apparatus 10 of an example embodiment, such as the processor 12 or the like, is configured to determine whether a bi-modality condition currently exists by determining the distribution of speeds along the road segment upstream of the diverging downstream road segments. In this regard, the apparatus, such as the processor, may be configured to evaluate a plurality of probe points representative of travel along the road segment upstream of the diverging downstream road segments at the present time or in the recent past. In addition to generally identifying the location of the vehicle upon the road segment upstream of a plurality of divergent downstream road segments, the probe points may identify the location with sufficient granularity as to permit the lane in which the vehicle is traveling along the road segment upstream of the divergent downstream road segments to be identified. In an example embodiment, the probe points may provide the location with sufficient specificity such that the link of the road segment and the lane of the road segment in which the vehicle is traveling at the time that the probe point is captured may be identified.

In order to determine whether a bi-modality condition currently exists at a respective split lane traffic location, the apparatus 10 of this example embodiment also includes means, such as the processor 12 or the like, for evaluating the distribution to cluster the speeds into a higher speed cluster and a lower speed cluster. Further, the apparatus 10 of an example embodiment also includes means, such as the processor 12 or the like, for identifying a bi-modality condition upstream of the diverging downstream road segments based upon a relationship between the higher speed and the lower speed, such as based upon the magnitude of the bi-modality value BiM. In an instance in which the magnitude of bi-modality is zero or is at least less than a predefined threshold, the apparatus, such as the processor, may be configured to determine that the distribution of the speeds associated with the probe points does not indicate a bi-modality condition, such as an instance in which traffic moves along each lane of the road segment upstream of the diverging downstream road segments in a relatively uniform manner. However, in an instance in which the magnitude of bi-modality exceeds the predefined threshold, a bi-modality condition may be identified.

Once a current bi-modality condition has been identified along the road upstream of the diverging downstream road segments of a respective split lane traffic location, the apparatus 10 of an example embodiment includes means, such as the processor 12 or the like, for determining the extent of the bi-modality condition upstream of the diverging downstream road segments. The extent of the bi-modality condition may be defined in various manners. In an example embodiment, the apparatus, such as the processor, may be configured to define the bi-modality condition to extend along the entire road segment upstream of the diverging downstream road segments. However, in another example embodiment, the individual links of the road segment upstream of the diverging downstream road segments are evaluated to determine if the respective link is subject to the bi-modality condition. In regard to determining whether the bi-modality condition exists for each link of the road segment upstream of the diverging downstream road segments, the apparatus, such as the processor, of an example embodiment may sequentially evaluate each link beginning with the link at or closest to the location at which the downstream road segments diverge, such as link L1 in FIG. 3, and continuing link-by-link in an upstream direction away from the point at which the downstream road segments diverge. Each link is evaluated in order to determine if the respective link satisfies the bi-modality condition. The extent of the bi-modality condition is configured to extend upstream of the point at which the downstream road segments diverge until a predefined condition is satisfied, such as until a predefined number of consecutive links fail to satisfy the bi-modality condition or until one or more consecutive links of at least a predefined length fail to satisfy the bi-modality condition.

In conjunction with the determination as to whether a bi-modality condition currently exists at a respective split lane traffic location, the apparatus 10 of this example embodiment also includes means, such as the processor 12 or the like, for identifying the lane of the road segment immediately upstream of diverging downstream road segments that is associated with each of the higher speed cluster and the lower speed cluster. In an example embodiment, the apparatus, such as the processor, separately determines the difference between the higher speed HS of the higher speed cluster to the average speed of each downstream segment, such as segments S2 and S3 in the example of FIG. 3. The apparatus, such as the processor, of this example embodiment is configured to associate the higher speed HS with the downstream segment that has the closest average speed. The lower speed may, in turn, be associated with the other downstream segment. In an example embodiment, the apparatus, such as the processor, requires the higher speed to be within a predefined speed differential, such as 10 kph, of the closest average speed of the downstream segments with the higher speed and lower speed LS values being considered invalid if the higher speed is not within the predefined speed differential of the closest average speed.

Once the higher speed and the lower speed have been associated with respective ones of the diverging downstream road segments, the lanes of the upstream road segment that correspond to the downstream road segments, such as by most directly feeding into or otherwise being effected by the traffic along the downstream road segments, may also be associated with the higher speed and the lower speed in the same manner as the corresponding downstream road segments. For example, in an instance in which an exit lane diverges to the right of a roadway, the right lane corresponds to the exit lane since the right lane will be most effected by the traffic along the exit lane. Thus, right lane of the upstream road segment and the exit lane may be associated with the same one of the higher or lower speeds, namely, the lower speed. Conversely, the left lane of the upstream road segment corresponds to the downstream road segment that continues past the exit lane since the left lane will feed into the downstream road segment that continues onward past the exit lane. Thus, the left lane of the upstream road segment and the downstream road segment that continues onward past the exit lane may be associated with the same one of the higher and lower speeds, namely, the higher speed.

The foregoing process of determining whether a bi-modality condition exists at a respective split lane traffic location and, if so, the extent of the bi-modality condition may be repeated for each split lane traffic location that has been identified and, for each split lane traffic location, at a plurality of different instances in time, such as every 5, 10, 15 or 30 minutes. In an example embodiment, the frequency with which a determination is made as to whether a bi-modality condition currently exists at a split lane traffic location is dependent upon, such as by having a direct relationship, e.g., being proportional, to, the bi-modality frequency that was determined for the respective split lane traffic location. Thus, the determination as to whether a bi-modality condition currently exists at a split lane traffic location may be performed more frequently for a split lane traffic location having a greater bi-modality frequency than for a split lane traffic location having a lower bi-modality frequency. The bi-modality frequency may also be utilized for other purposes. For example, traffic cameras may be selectively positioned at the split lane traffic locations having the greatest bi-modality frequencies.

In some example embodiments, the apparatus 10, such as the processor 12, is configured to determine patterns associated with the occurrence of the bi-modality condition at a respective split lane traffic location. For example, the bi-modality condition may occur at a respective split lane traffic location only during rush hour, such as between 7 AM and 9 AM and between 4 PM and 7 PM. In this example embodiment, the determination as to whether a bi-modality condition currently exists at a respective split lane traffic location may be performed during the time periods in which a bi-modality condition has historically occurred, but not during other periods of time. Alternatively, the determination as to whether a bi-modality condition currently exists at a respective split lane traffic location may be performed with a greater frequency during the time periods in which a bi-modality condition has historically occurred, and at a lower frequency during other periods of time.

The apparatus 10 of an example embodiment, such as the processor 12, the communication interface 16, the user interface 18 or the like, may also be configured to cause notification of a current bi-modality condition to be provided, such as to a user device. In order to provide such a notification, in an instance in which a bi-modality condition is identified based upon the current traffic proximate a split lane traffic location, the apparatus 10, such as the processor 12, may create a split lane traffic incident. In this regard, a record of the split lane traffic incident may be generated that includes an identification of the split lane traffic location and the time at which the bi-modality condition was identified. In some embodiments, the record of the split lane traffic incident that is generated also includes an indication of the extent of the bi-modality condition upstream of the diverging downstream road segments. The record of the split lane traffic incident may also include an indication of the speed of the traffic, such as the lower speed, and an indication of the one or more lanes of the upstream road segment for which the traffic is progressing at the lower speed. The record of the split lane traffic incident may be stored, such as in memory 14, and may then be utilized for various purposes including routing, mapping and alerting.

In regards to routing, a split lane traffic incident may be reviewed, such as by the processor 12, to determine if it would be advisable to reroute the vehicle so as to avoid the split lane traffic incident and to, instead, proceed to the destination along an alternative route. Regardless of whether the vehicle is rerouted, the apparatus 10, such as the processor, may take into account a split lane traffic incident in regards to the determination of an estimated time of arrival at a destination. As such, the estimated time of arrival is more reflective of current road conditions and, as a result, is more accurate.

With respect to the mapping functionality, the apparatus 10, such as the processor 12, may be configured to generate a map display of a split lane traffic location in an instance in which a split lane traffic incident has been identified. The map display may then be provided to a user device, such as a navigation system, an ADAS, a GPS, a PND, a portable navigation device or other personal computing device, such as a mobile telephone, a tablet computer or the like. In this regard, the map display may be generated by the apparatus and thereafter presented by the user device in a manner that differently depicts the lanes of the upstream road segment and the diverging downstream road segments depending upon whether the lanes of the upstream road segment and diverging downstream road segments are currently supporting traffic flow at the higher speed or the lower speed. As shown in FIG. 7, for example, a map display may be generated in which the left lanes 100 of the upstream road segment are proceeding at the lower speed, while the right lanes 102 of the upstream road segment are proceeding at the higher speed. Thus, the left lane of the upstream road segment as well as the diverging downstream road segment that the left lanes feed into are depicted in one fashion, while the right lane of the upstream road segment and the diverging downstream road segment that the right lane of the upstream road segment feeds into are depicted in a different fashion, thereby providing a quick and intuitive reference to the user of the relative traffic conditions proximate the split lane traffic location. In an instance in which a user desires a more granular representation of the lanes, the user may select a particular portion of the map display, such as by clicking or touching the upstream road segment as presented by the user interface of the user device, and may, in turn, be presented with a display as also shown in FIG. 7 that depicts each of the lanes of the upstream road segment and an indication associated with each lane as to whether traffic in the respective lane is traveling at the higher speed or the lower speed. For example, traffic traveling at a higher speed, such as in the right lanes 102 of the upstream road segment, may be depicted with arrows of a first color, which traffic traveling at a lower speed, such as in the left two lanes 100 of the upstream road segment, may be depicted with arrows of a different color.

With respect to the alerting functionality, the apparatus 10, such as the processor 12, the communication interface 16 or the like, may be configured to generate a split lane congestion alert message that is provided to the user device. The split lane congestion alert message may also be stored, such as in memory 14, in some embodiments. For example, the split lane congestion alert message may be included as part of an incident feed that also includes messages indicative of roadway accidents, construction, etc. The split lane congestion alert message may be associated with a predefined event code. The split lane congestion alert message may identify the lanes of the upstream road segment that are progressing at the lower speed, such as by either indicating the particular lanes, e.g., the two left lanes, or by more generally indicating that the sluggishness in traffic flow is "on the left" or alternatively "on the right". The split lane congestion alert message may also optionally indicate the lower speed at which the traffic in the congested lanes is traveling.

Various protocols have been defined for broadcasting traffic messages. In order to provide a split lane congestion alert message, a new message may be defined or an existing message may be modified to include a new or repurposed field to convey information regarding the split lane congestion. By way of example, the Traffic Message Channel (TMC) is one protocol for broadcasting traffic messages. In order to convey information regarding split lane congestion, a new Lane (LN) attribute may be introduced by the TMC protocol within a SubSegment (SS) attribute. The LN attribute may provide information regarding specific lanes along a roadway. The LN attribute may numerically reference the respective lanes as 1, 2, . . . from the leftmost lane to the rightmost lane. The LN attribute may provide information, such as speed and/or jam factor, for one or more of the respective lanes. The speed is the average speed that current traffic is traveling within the respective lane of the road, while the jam factor of the respective lane is a number, such as between 0.0 and 10.0, calculated based upon the speed within the lane and the jam factor of the road and indicative of the expected quality of travel with lower numbers indicative of a better quality of travel. Thus, a road closure will cause a jam factor of 10.0. Thus, split lane congestion may be identified from the LN attributes in an instance in which the speed and/or jam factors vary significantly between the different lanes of the same road subsegment.

Another protocol for broadcasting traffic messages was developed by the Traffic Experts Protocol Group (TPEG). In the TPEG protocol, a road may be segmented into different sections with an average speed at which the current traffic is traveling associated with each section. In an instance in which the traffic traveling along the different lanes have different average speeds, such as average speeds that differ by more than a predefined amount, the same stretch of the road may include two or more sections with each section including different lanes of the road. In contrast to the TMC protocol, the TPEG protocol numerically references the respective lanes as 1, 2, . . . from the rightmost lane to the leftmost lane. By way of example, a road may include a first section that extends 1900 meters and has an average speed of 60 kilometers per hour (kph), second and third sections that extend from the first section for 800 meters with the second section including lanes 2 and 3 and having an average speed of 40 kph and the third section including lane 1 and having an average speed of 20 kph, and finally a fourth section that extends from the second and third sections and has an average speed of 90 kph. In relation to a respective one or more of the sections, the TPEG protocol may also include a field in the traffic messages that is indicative of a lane restriction. Consequently, split lane congestion may be identified in an instance in which a lane restriction is identified for one section including some, but not all, lanes of a road, but not for another section including the other lanes of the road.

Yet another protocol for broadcasting traffic messages is the AlertC protocol. In this protocol, an event code of 136 may be defined to be indicative of traffic congestion and the average speed may be optionally provided. In relation to split lane congestion in which the different lanes of a road experience appreciably different degrees of congestion, the traffic congestion event code 136 may be supplemented with an AlertC supplementary code of "on the right" 141 or "on the left" 143 to indicate the relative side of the road on which the lanes are more congested.

In response to receipt of a split lane congestion alert message, the user device may be configured to alert the user. For example, a map of the split lane traffic location may be displayed with a split lane event message superimposed thereon. See, for example, FIG. 8 which illustrates such a display. As shown in FIG. 8, the display not only provides an indication of the lanes that are progressing at the higher speed and the lower speed, that may also give advice to a driver to avoid the lanes that are traveling at the lower speed in an instance in which the route of the vehicle can proceed along the lanes of the roadway that are moving at the higher speed. With respect to the foregoing examples, the user device may be configured to identify the split lane congestion alert message in accordance with the protocol with which the traffic messages are broadcast and to correspondingly generate the display based upon the lane level information as shown, for example, in FIG. 8. In an instance in which the traffic messages are broadcast in accordance with the TMC protocol, the user device may be configured to identify split lane congestion from the LN attributes in an instance in which the speed and/or jam factors vary significantly between the different lanes of the same road subsegment. For traffic messages that are broadcast in accordance with the TPEG protocol, the user device may be configured to identify split lane congestion in an instance in which a lane restriction is identified for one section including some, but not all, lanes of a road, but not for another section including the other lanes of the road. Further, for traffic messages that are broadcast in accordance with the AlertC protocol, the user device may be configured to identify the traffic congestion event code 136 as supplemented with an AlertC supplementary code of "on the right" 141 or "on the left" 143. In addition to identifying the split lane congestion, the user device is also configured to generate the display so as to illustrate the specific lanes that are experiencing congestion based upon the information provided by the traffic messages.

In addition or alternatively, the user device may provide the split lane event message in other manners, such as via a text message or an audible alert message. In an example embodiment in which a traffic camera is positioned so as to capture the split lane traffic location, the apparatus 10 may be configured to provide the user device with an image or a video, such as a real time feed, from the traffic camera such that the user device may provide a display of the image or video from the traffic camera in order to further inform the user. Regardless of the manner in which the split lane event message is presented, the driver of the vehicle may be more fully informed of the split lane traffic incident and, as such, may respond accordingly in order to avoid being inadvertently delayed by the congestion.

FIG. 2 illustrates a flowchart of an apparatus, method and computer program product according to example embodiments of the invention. It will be understood that each block of the flowcharts, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    for each of a plurality of epochs, determining, with a processor, a distribution of speeds associated with a plurality of historical probe points representative of travel along a road segment upstream of diverging downstream road segments during the respective epoch;
    for each of the plurality of epochs, evaluating, with the processor, the distribution so as to cluster the speeds associated with the plurality of historical probe points during the respective epoch into a higher speed cluster associated with a higher speed and a lower speed cluster associated with a lower speed;
    for each of the plurality of epochs, determining, with the processor, whether a bi-modality condition exists upstream of the diverging downstream road segments based upon a relationship between the higher speed and the lower speed during the respective epoch;
    identifying, with the processor, a split lane traffic location based upon a bi-modality frequency with which a bi-modality condition is determined from the historical probe points associated with the plurality of epochs; and
    causing, with the processor, at least one of routing of a vehicle, determination of an estimated time of arrival, generation of a map display or generation of a split lane congestion alert message based upon identification of the split lane traffic location.

2. A method according to claim 1 wherein the road segment upstream of the diverging downstream road segments comprises a plurality of links, and wherein determining the distribution of speeds, evaluating the distribution, and determining whether a bi-modality condition exists are performed for the link closest to the diverging downstream road segments for each of the plurality of epochs.

3. A method according to claim 1 further comprising determining the bi-modality frequency based upon a relationship between a number of epochs for which the bi-modality condition is determined to exist and a total number of epochs for which the historical probe points are evaluated.

4. A method according to claim 3 wherein determining the relationship comprises determining a ratio of the number of epochs for which the bi-modality condition is determined to exist to the total number of epochs for which the historical probe points are evaluated.

5. A method according to claim 1 wherein identifying the split lane traffic location comprises identifying the upstream road segment and the diverging downstream road segments as the split lane traffic location in an instance in which the bi-modality frequency satisfies a predefined threshold.

6. A method according to claim 1 wherein determining whether a bi-modality condition exists comprises separating the speeds associated with the plurality of historical probe points for the respective epoch into a plurality of bins and determining a bi-modality value based upon a difference between mean speeds of the different bins and also based on a range of the speeds.

7. A method according to claim 6 wherein determining the bi-modality value comprises determining the bi-modality value based upon a ratio of the difference between mean speeds of the different bins and the range of the speeds during the respective epoch.

8. An apparatus comprising at least one processor and at least one memory including computer program code, the at least one memory and computer program code configured to, upon execution of the computer program code by the processor, cause the apparatus to perform at least each of the following:
    for each of a plurality of epochs, determine a distribution of speeds associated with a plurality of historical probe points representative of travel along a road segment upstream of diverging downstream road segments during the respective epoch;
    for each of the plurality of epochs, evaluate the distribution so as to cluster the speeds associated with the plurality of historical probe points during the respective epoch into a higher speed cluster associated with a higher speed and a lower speed cluster associated with a lower speed;
    for each of the plurality of epochs, determine whether a bi-modality condition exists upstream of the diverging downstream road segments based upon a relationship between the higher speed and the lower speed during the respective epoch;
    identify a split lane traffic location based upon a bi-modality frequency with which a bi-modality condition is determined from the historical probe points associated with the plurality of epochs; and causing at least one of routing of a vehicle, determination of an estimated time of arrival, generation of a map display or generation of a split lane congestion alert message based upon identification of the split lane traffic location.

9. An apparatus according to claim 8 wherein the road segment upstream of the diverging downstream road segments comprises a plurality of links, and wherein the at least one memory and the computer program code are configured to, with the processor, cause the apparatus to determine the distribution of speeds, evaluate the distribution, and determine whether a bi-modality condition exists are performed for the link closest to the diverging downstream road segments for each of the plurality of epochs.

10. An apparatus according to claim 8 wherein the at least one memory and the computer program code are further configured to, with the processor, cause the apparatus to determine the bi-modality frequency based upon a relationship between a number of epochs for which the bi-modality condition is determined to exist and a total number of epochs for which the historical probe points are evaluated.

11. An apparatus according to claim 10 wherein the at least one memory and the computer program code are configured to, with the processor, cause the apparatus to determine the relationship by determining a ratio of the number of epochs for which the bi-modality condition is determined to exist to the total number of epochs for which the historical probe points are evaluated.

12. An apparatus according to claim 8 wherein the at least one memory and the computer program code are configured to, with the processor, cause the apparatus to identify the split lane traffic location by identifying the upstream road segment and the diverging downstream road segments as the split lane traffic location in an instance in which the bi-modality frequency satisfies a predefined threshold.

13. An apparatus according to claim 8 wherein the at least one memory and the computer program code are configured to, with the processor, cause the apparatus to determine whether a bi-modality condition exists by separating the speeds associated with the plurality of historical probe points for the respective epoch into a plurality of bins and determining a bi-modality value based upon a difference between mean speeds of the different bins and also based on a range of the speeds.

14. An apparatus according to claim 13 wherein the at least one memory and the computer program code are configured to, with the processor, cause the apparatus to determine the bi-modality value by determining the bi-modality value based upon a ratio of the difference between mean speeds of the different bins and the range of the speeds during the respective epoch.

15. A computer program product comprising at least one non-transitory computer-readable storage medium having computer-executable program code portions stored therein, the computer-executable program code portions comprising program code instructions configured, upon execution by a processor, for:

for each of a plurality of epochs, determining a distribution of speeds associated with a plurality of historical probe points representative of travel along a road segment upstream of diverging downstream road segments during the respective epoch;

for each of the plurality of epochs, evaluating the distribution so as to cluster the speeds associated with the plurality of historical probe points during the respective epoch into a higher speed cluster associated with a higher speed and a lower speed cluster associated with a lower speed;

for each of the plurality of epochs, determining whether a bi-modality condition exists upstream of the diverging downstream road segments based upon a relationship between the higher speed and the lower speed during the respective epoch;

identifying a split lane traffic location based upon a bi-modality frequency with which a bi-modality condition is determined from the historical probe points associated with the plurality of epochs; and causing at least one of routing of a vehicle, determination of an estimated time of arrival, generation of a map display or generation of a split lane congestion alert message based upon identification of the split lane traffic location.

16. A computer program product according to claim 15 wherein the road segment upstream of the diverging downstream road segments comprises a plurality of links, and wherein the program code instructions configured to determine the distribution of speeds, evaluate the distribution, and determine whether a bi-modality condition exists are performed for the link closest to the diverging downstream road segments for each of the plurality of epochs.

17. A computer program product according to claim 15 wherein the computer-executable program code portions further comprise program code instructions configured to determine the bi-modality frequency based upon a relationship between a number of epochs for which the bi-modality condition is determined to exist and a total number of epochs for which the historical probe points are evaluated.

18. A computer program product according to claim 17 wherein the program code instructions configured to determine the relationship comprise program code instructions configured to determine a ratio of the number of epochs for which the bi-modality condition is determined to exist to the total number of epochs for which the historical probe points are evaluated.

19. A computer program product according to claim 15 wherein the program code instructions configured to identify the split lane traffic location comprise program code instructions configured to identify the upstream road segment and the diverging downstream road segments as the split lane traffic location in an instance in which the bi-modality frequency satisfies a predefined threshold.

20. A computer program product according to claim 15 wherein the program code instructions configured to determine whether a bi-modality condition exists comprise program code instructions configured to separate the speeds associated with the plurality of historical probe points for the respective epoch into a plurality of bins and program code instructions configured to determine a bi-modality value based upon a difference between mean speeds of the different bins and also based on a range of the speeds.

* * * * *